Oct. 27, 1959 S. BRAND 2,910,669

SYSTEM FOR MAGNETIC STORAGE OF DATA

Filed June 2, 1955 11 Sheets-Sheet 1

INVENTOR.
SAMUEL BRAND
BY
Burton P. Beatty
ATTORNEY

INVENTOR.
SAMUEL BRAND
BY
Burton P. Beatty
ATTORNEY

Oct. 27, 1959 S. BRAND 2,910,669

SYSTEM FOR MAGNETIC STORAGE OF DATA

Filed June 2, 1955 11 Sheets-Sheet 3

*INVENTOR.*
SAMUEL BRAND

*BY*

Burton P. Beatty

ATTORNEY

INVENTOR.
SAMUEL BRAND

BY

Burton P. Beatty
ATTORNEY

INVENTOR.
SAMUEL BRAND
BY
Burton P. Beatty
ATTORNEY

SYSTEM FOR MAGNETIC STORAGE OF DATA

Filed June 2, 1955

INVENTOR.
SAMUEL BRAND
BY
Burton P. Beatty
ATTORNEY

Oct. 27, 1959 S. BRAND 2,910,669

SYSTEM FOR MAGNETIC STORAGE OF DATA

Filed June 2, 1955 11 Sheets-Sheet 7

INVENTOR.
SAMUEL BRAND

BY

Burton P. Beatty
ATTORNEY

INVENTOR.
SAMUEL BRAND
BY Burton P. Beatty
ATTORNEY

INVENTOR.
SAMUEL BRAND
BY Burton P. Beatty
ATTORNEY

Oct. 27, 1959 S. BRAND 2,910,669

SYSTEM FOR MAGNETIC STORAGE OF DATA

Filed June 2, 1955 11 Sheets-Sheet 11

INVENTOR.
SAMUEL BRAND
BY
Burton P. Beatty
ATTORNEY 2,910,669
Patented Oct. 27, 1959

2,910,669

SYSTEM FOR MAGNETIC STORAGE OF DATA

Samuel Brand, Binghamton, N.Y., assignor to International Business Machines Corporation, New York, N.Y., a corporation of New York Application June 2, 1955, Serial No. 512,613

11 Claims. (Cl. 340—174)

This invention relates to data storage apparatus and more particularly to such apparatus wherein data is magnetically stored.

In the use of electrical accounting machines it is sometimes desirable to store information for various periods of time and yet have the information available for reproduction at the proper time. By storing information on magnetizable areas of a plate or other member movable at high speed the data will be readily accessible for reproduction by the accounting machine. A plurality of these plates can be utilized to store the required information. The apparatus of the present invention is adapted for use with an accounting machine to select a storage plate from a group of plates on one machine cycle of accounting machine operation and reproduce the data stored on the selected plate on the first part of the following machine cycle. New data can be recorded on the plate during the latter part of this cycle. The features of this invention, however, are not limited to use with electrical accounting machines, but may be applied to any electrical machine wherein the selecting, reproducing and recording of data is required.

The principal object of this invention is to provide an improved apparatus for reproducing information from and recording information on a member selected from a group of storage members.

Another object of the invention is to provide a magnetic plate storage apparatus having increased storage capacity.

A further object is to provide a plate storage apparatus adapted for use with an accounting machine.

The preferred embodiment of the invention disclosed herein provides a storage box having forty storage plates arranged side by side. An electromagnetically controlled plate selecting mechanism chooses the desired storage plate on one cycle of accounting machine operation. Magnetic heads arranged in two rows on a movable carriage are provided for scanning recording areas or positions on the plate. These heads are adjusted for cooperation with certain recording positions on the plate on the same cycle that the plate selection occurs. On the following cycle the selected plate is moved between the rows of magnetic heads in two directions so that the plate is scanned a plurality of times. The heads are conditioned to transduce the certain recording positions when the plate is moved in either direction.

Other objects of the invention will be pointed out in the following description and claims and illustrated in the accompanying drawings, which disclose, by way of examples, the principle of the invention and the best mode, which has been contemplated, of applying that principle.

Figure 9A:
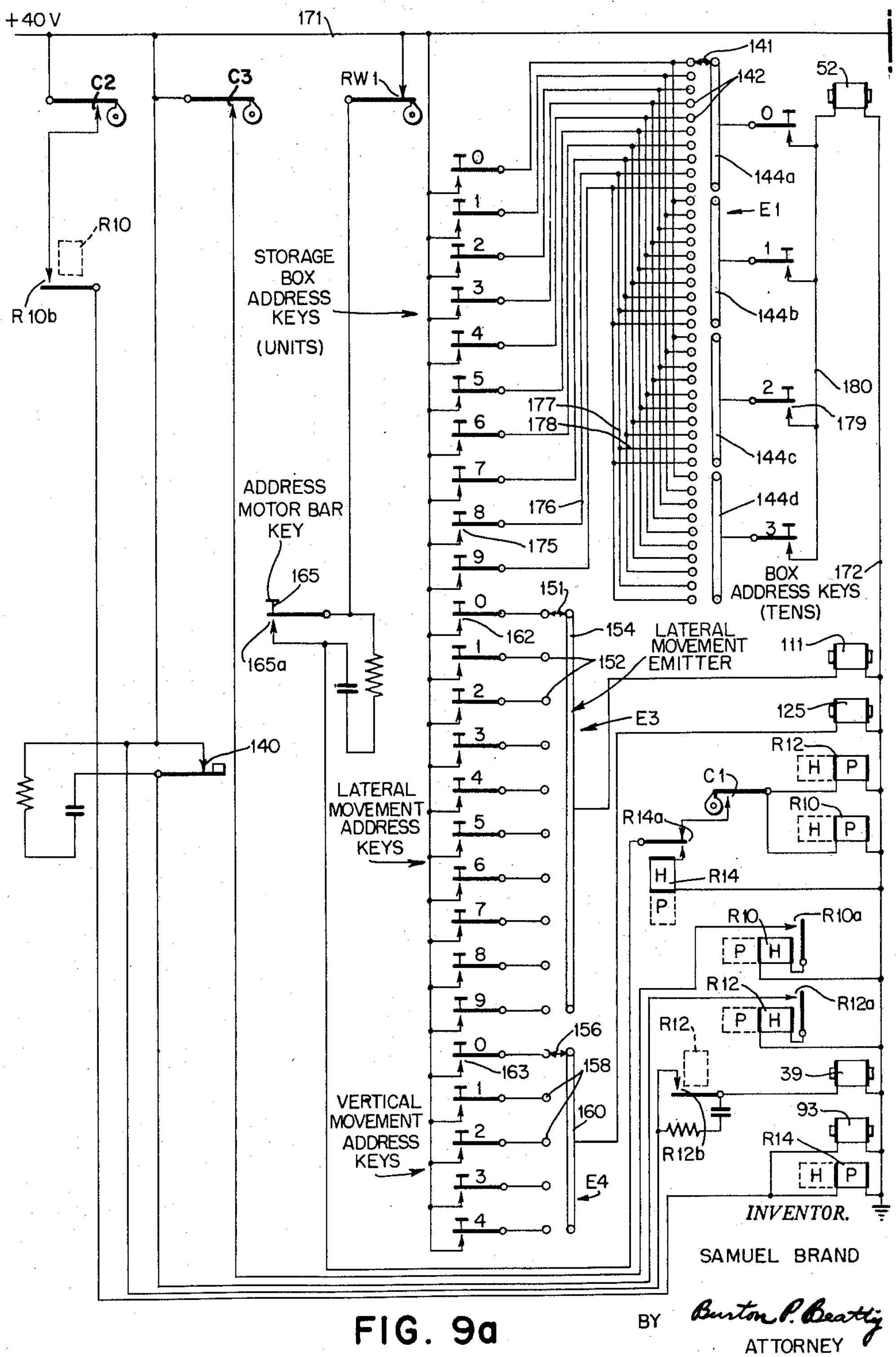
Figure 9B:
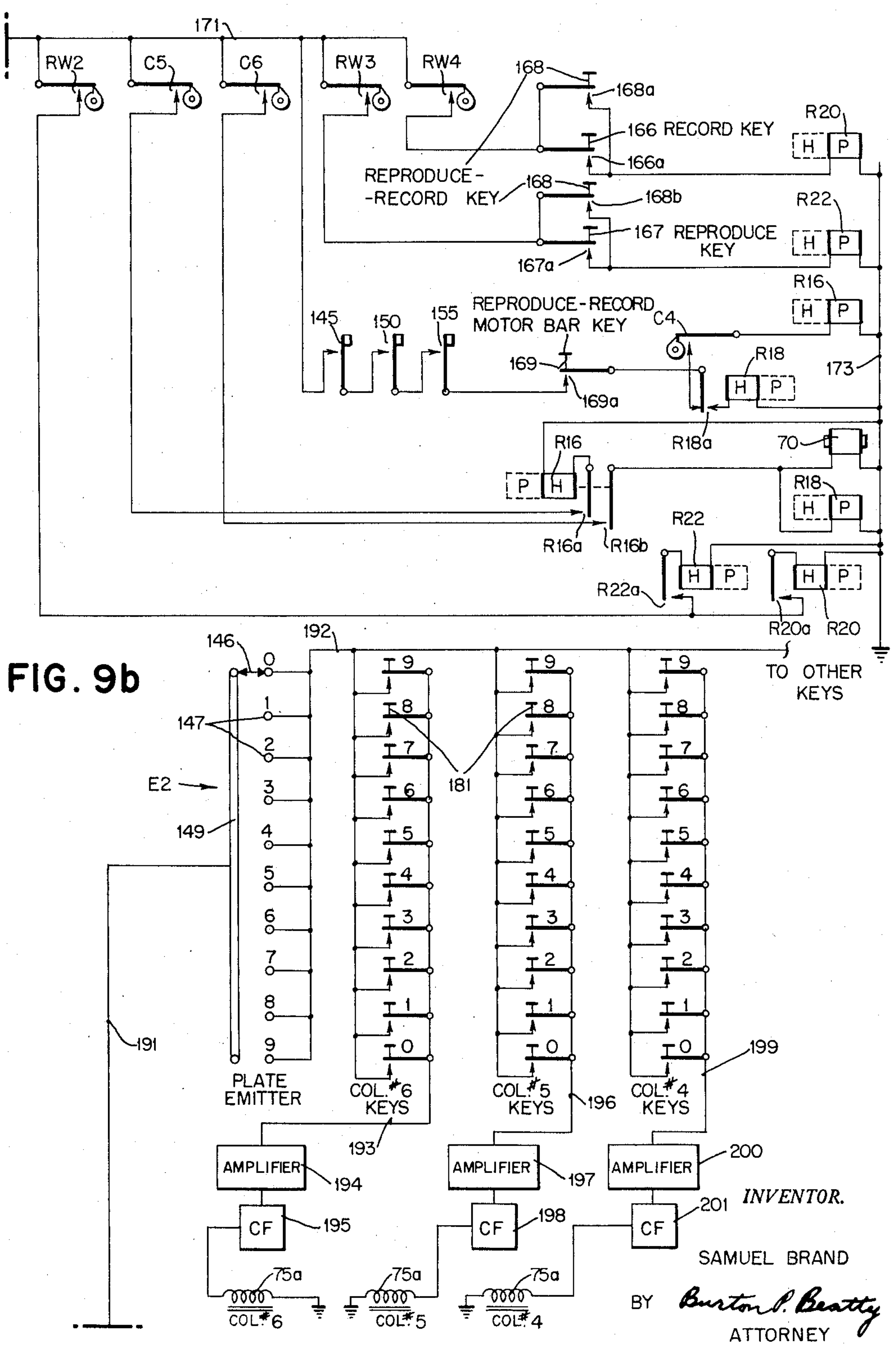
Figure 9C:
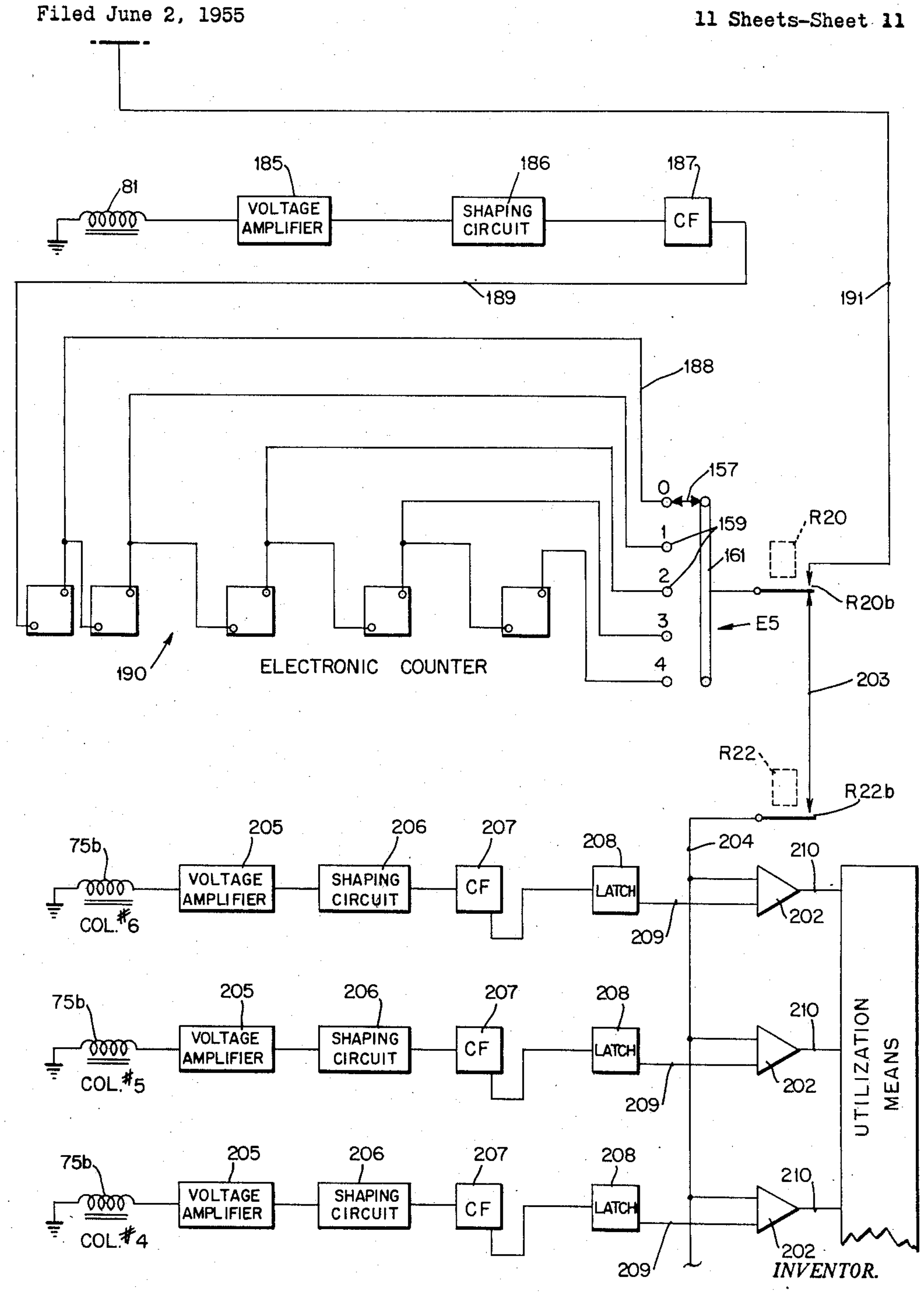

Figs. 9*a*, 9*b* and 9*c* taken together comprise an electrical wiring diagram of the preferred form of the invention. Fig. 9*c* shows parts of the control circuits which are well known in the art in block diagram.

Figure 1:
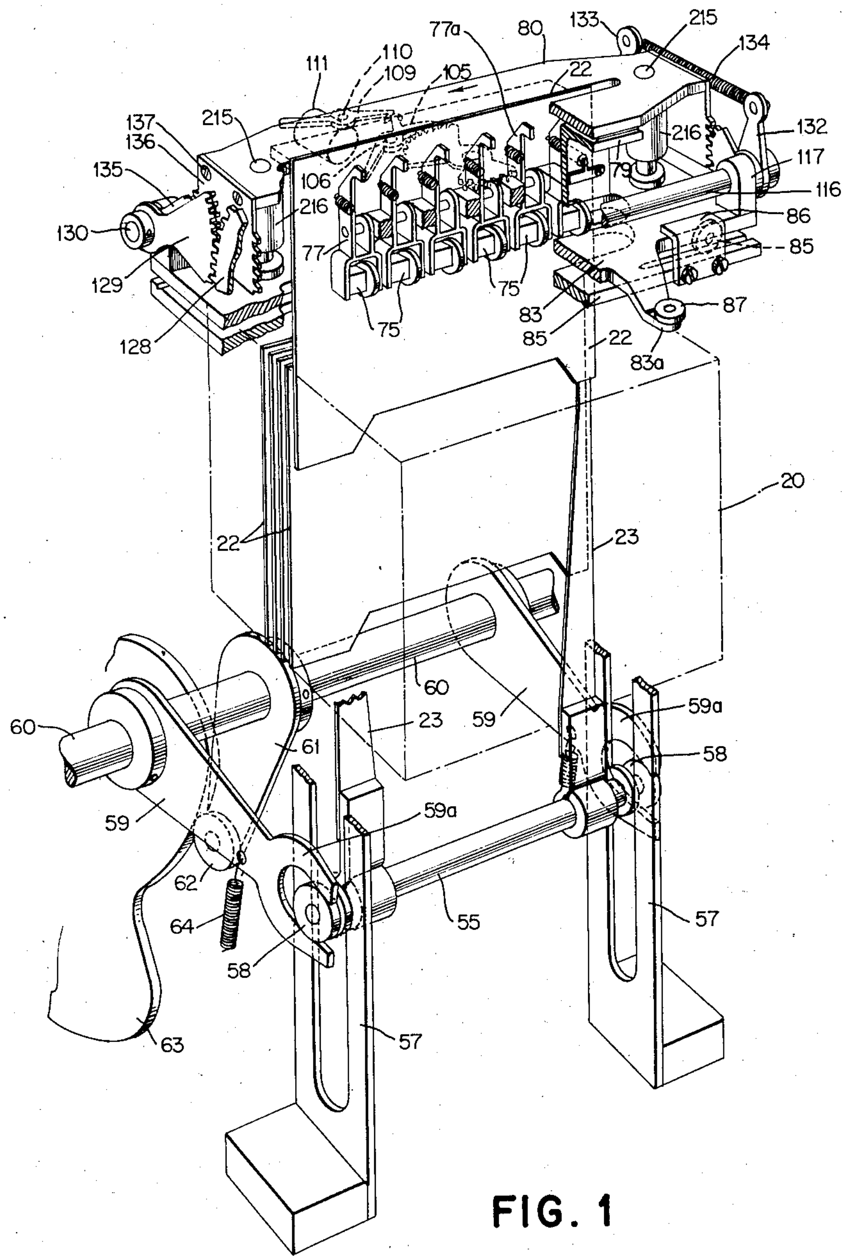
Fig. 1 is a perspective view of the essential components of the preferred embodiment of the present invention.
Figure 3:
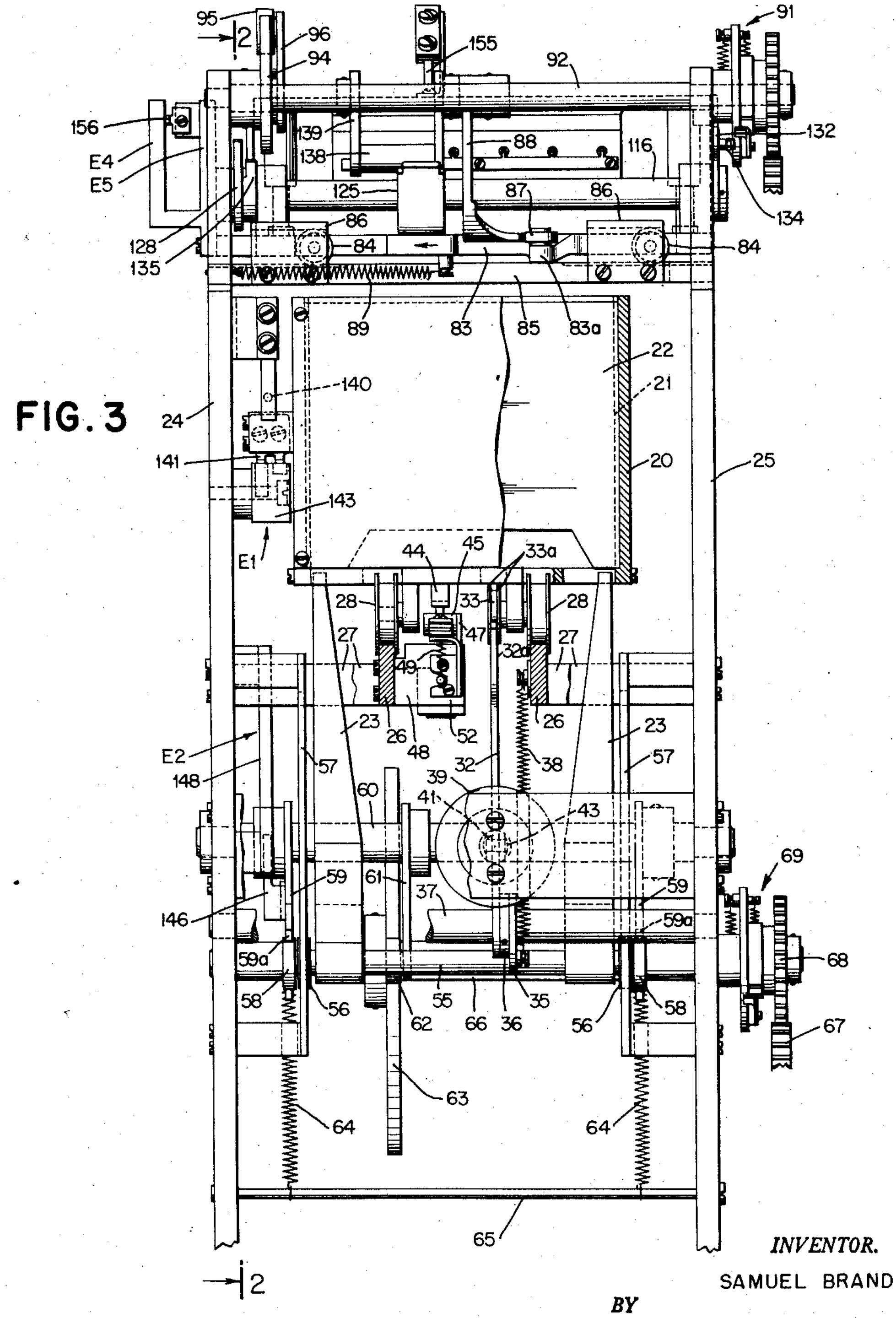
Fig. 3 is an end view of the plate selecting mechanism looking in the direction of lines 3—3 of Fig. 2.

Referring to Figs. 1 and 3, a shiftable storage box 20 is shown having a series of longitudinal slots 21 (Fig. 3) holding a number of storage plates 22. The plates are free to slide up and down in the slots 21. The exact structure of these plates will be explained hereinafter in connection with the reproducing and recording mechanism. A selected plate can be moved upwardly by a pair of pusher arms 23 for the reproducing operation as will now be described.

Figure 2:
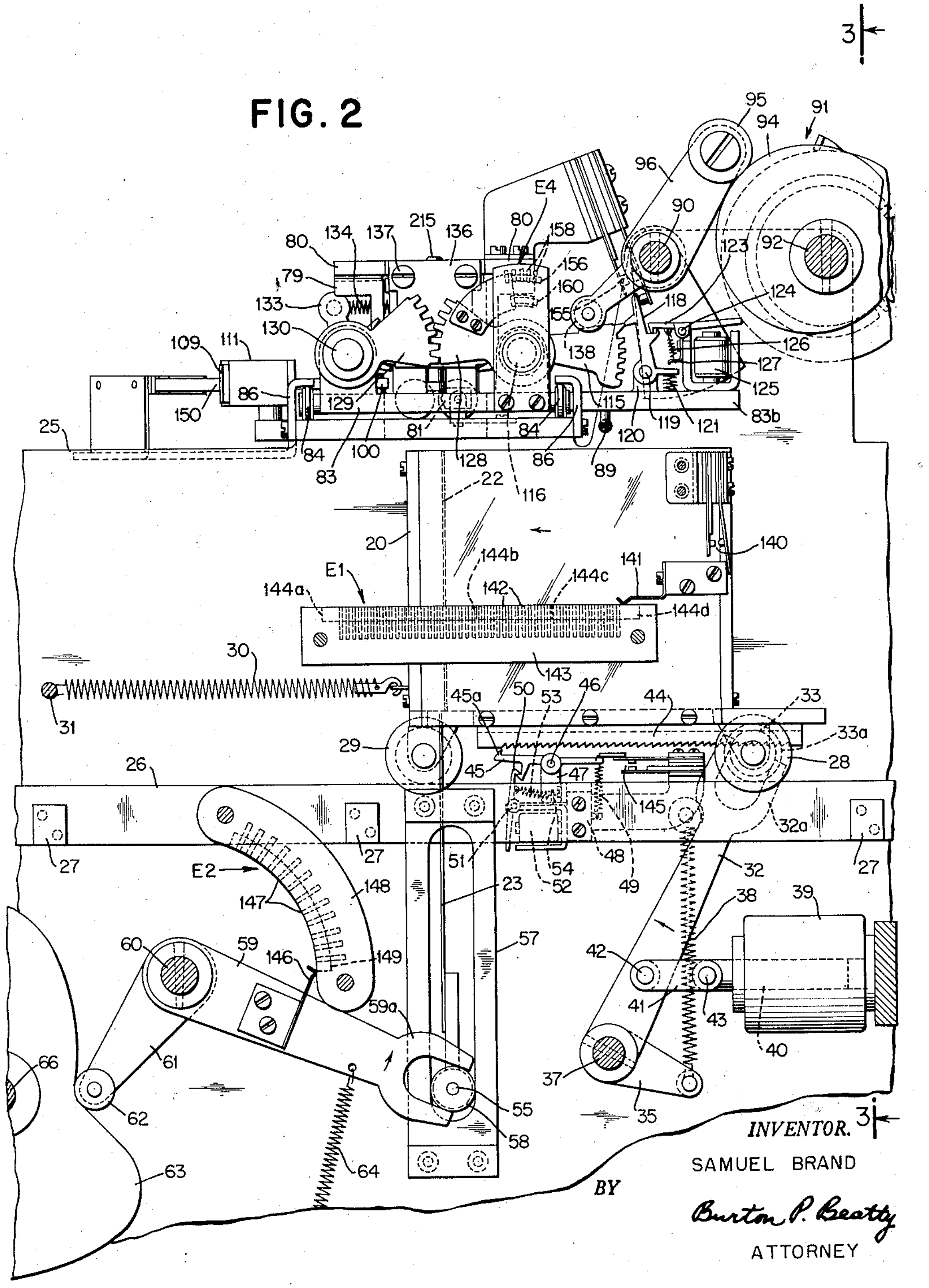
Fig. 2 is a side elevation view with the side frame removed looking in the direction of lines 2—2 in Fig. 3 and showing the mechanism for selecting a storage plate.

The mechanism by which a plate 22 is selected and moved for reproducing information therefrom is supported between side frame members 24 and 25 as shown in Figs. 2 and 3. A pair of rails designated 26 are supported by braces 27 extending from each of the side frames 24 and 25 respectively. The storage box 20 is mounted for movement on two sets of rollers designated 28 and 29. Each of these rollers is provided with a groove which cooperates with the upper portion of a rail 26 to movably support the box 20.

A spring 30 extends between the box 20 and a tie bar 31 which connects side frames 24 and 25, to constantly urge the box to the left as viewed in Fig. 2. Box 20 is held against the pressure of spring 30 by an arm 32 which has a forked end **32*a* engaging a stud 33 carried by a lug projecting downwardly from box 20. This stud is provided with side members 33*a* which form a groove for retaining the arm 32 in contact with the stud. A spring arm 35 is rigidly connected to arm 32 through a spacer hub 36 which fastens both arm 32 and arm 35 on a rod 37. The rod is mounted for rotation in side frames 24 and 25. A spring 38 extends between spring arm 35 and one rail 26 to urge the arm 32 in a counterclockwise direction as viewed in Fig. 2. The arm 32 is normally held against such movement by a solenoid 39. A pair of links designated 41 are pivotally connected to arm 32 at 42 and to solenoid plunger 40 at 43. While the solenoid 39 remains energized in a manner described hereinafter, the plunger 40 holds arm 32 in the position shown in Fig. 2 against the pressure of spring 38. When the solenoid is de-energized, the arm 32 is released and moves the box 20 to the left under pressure of spring 38. This action receives an initial start by pressure of spring 30 as explained previously. The box is adapted to open a pair of normally closed contacts 140 when it reaches the restored position shown in Fig. 2. The opening of these contacts causes the solenoid 39 to be deenergized. As the box moves to the left, interconnected conducting brushes 141 are moved over the electrically conductive segments 142 of an emitter E1 which controls the mechanism for interrupting the advance of the box at the selected position. The segments are mounted on an insulating plate 143 which carries a common strip 144 of conducting material. The brushes 141 are adapted in turn to contact the strip 144 and make wiping contact with the individual segments 142. The horizontal spacing between segments 142 corresponds to the spacing between the plates 22 and as the box 20 is advanced the brushes 141 will advance in a similar manner to successively cooperate with the several segments connecting each in turn with the common strip 144**.

A rack 44 is mounted on the undersurface of box 20 and is adapted for engagement by a pawl 45 to arrest the box 20 in its travel to the left so that a selected storage plate is in position for movement through the reproducing and recording mechanism. The spacing of the teeth on rack 44 is the same as the spacing of the plates 22 in the box 20 so that each plate which passes the pawl 45 is represented by a tooth on rack 44. For purposes of this description forty such teeth are shown representing forty plates contained in box 20. The pawl 45 is pivotally mounted at 46 on a bracket 47. The bracket is carried by a block 48 secured to one rail 26. The pawl 45 is provided with a tooth **45*a* projecting from its upper surface toward rack 44 and a spring 49 extends between the pawl and block 48 to bias the pawl upwardly. A latching member 50 is pivotally mounted at 51 on the yoke of a magnet 52 and a spring 53 extends between the latch 50 and bracket 54 to urge the latch into engagement with pawl 45 as shown in Fig. 2. The latch 50 is the armature of magnet 52 which is momentarily energized in a manner described hereinafter. When the magnet 52 is energized, the latch 50 is moved counterclockwise about pivot point 51 and against the pressure of spring 53 to release the pawl to engage its tooth 45*a* with a tooth on rack 44, thereby preventing any further travel of box 20 to the left. The pawl 45 is adapted to operate a pair of contacts 145** which are closed when the pawl is released. These contacts are located in a circuit which interlocks the box positioning operation with reproducing-recording operation.

Figure 8:
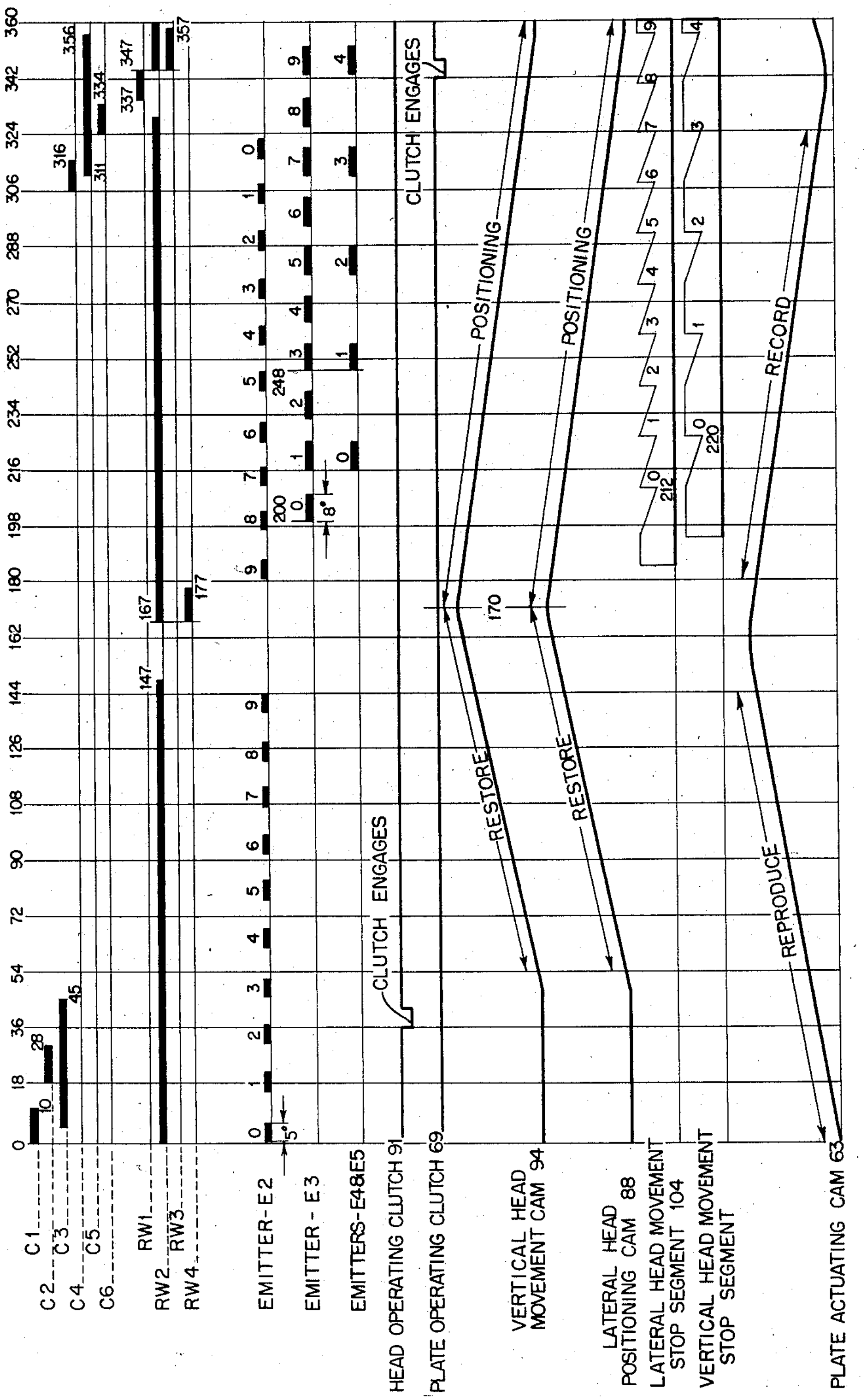
Fig. 8 is a timing diagram which can be followed to understand the operations of various mechanical and electrical devices shown herein.

The pusher arms 23 are freely mounted on a rod 55 which is moved upwardly to actuate the pusher arms. A pair of rollers 56 (Fig. 3) are carried on rod 55 and ride in vertical slots in a pair of guide plates 57 supported by brackets extending from side frames 24 and 25 respectively. The rod 55 is also provided with a pair of rollers 58 which reside in the forked ends **59*a* of a pair of actuating arms 59. These arms are secured to a shaft 60 supported for rotation in the side frames. A cam follower arm 61 is fastened to shaft 60 and carries a roller 62 which is held against the surface of a cam 63 under pressure of springs 64 extending between the actuating arms and a tie bar 65. The cam 63 is secured on a shaft 66 which is rotatably mounted in the side frames and projects through frame 25. The shaft 66 is driven from any suitable source through gears 67 and 68 and a clutch 69. This clutch is the well known one tooth ratchet type which is controlled by a magnet 70**, shown in Fig. 9*b* of the wiring diagram. Energization of the magnet 70 causes the clutch to engage to drive the shaft 66 one revolution. The cam 63 turns with shaft 66 to cause actuation of the pusher arms 23. The gears 67 and 68 are constantly driven to make one revolution each machine cycle. The term "machine cycle" as herein employed represents one revolution of the main drive shaft (not shown) of the accounting machine in which this storage device is employed and also one revolution of the contact operating cams prefixed with a C. The cams prefixed with RW are rotated only when the clutch 69 is engaged to turn shaft 66. The timing of the C and RW cams is shown in the diagram of Fig. 8.

The actuating arm 59 near frame 25 carries interconnected conducting brushes 146 which are moved in turn over the electrically conductive segments 147 and common strip 149 of an emitter E2 when the arm is moved upwardly by the cam 63. These segments 147 and strip 149 are mounted on an insulating plate 148. This emitter wipes each segment 147 twice before returning to home position. The segments 147 correspond to the ten digit levels on the storage plates 22 as will now be explained.

1. THE REPRODUCING AND RECORDING MECHANISM

The selected plate 22 is moved by the structure described hereinbefore between two rows of magnetic heads which can reproduce from and record information on both sides of the plate as it is passed vertically between them. The information is stored on the plate in the form of a magnetic spot or bit. The capacity of the plate is limited only by the size of the plate and whether or not both sides of the plate are utilized for storage purposes. In the event that only one side of the plate is used, the storage capacity is reduced by one half.

Figure 7:
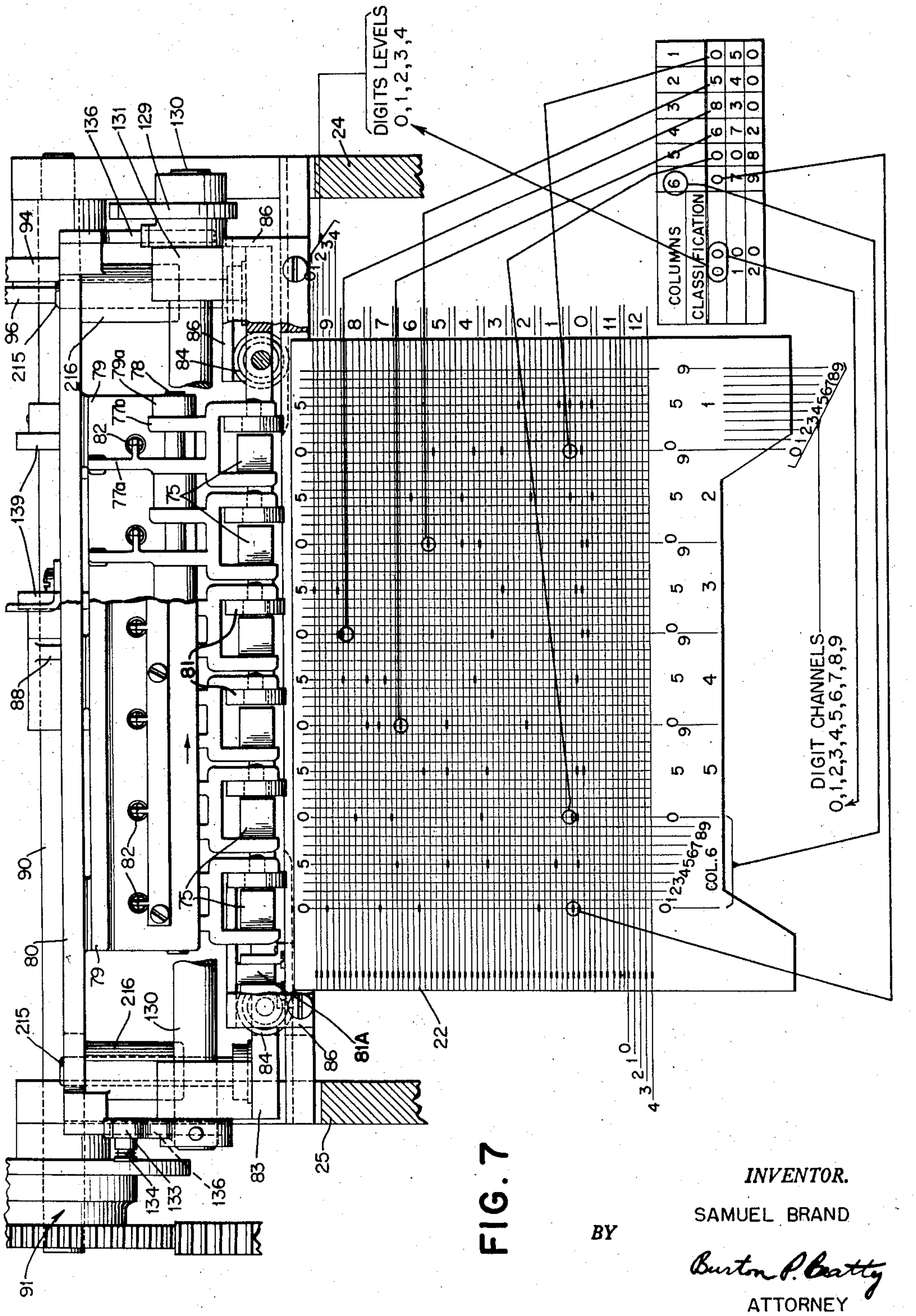
Fig. 7 is a detailed elevation view of the recording mechanism with parts broken away and showing the various recording positions on the storage plate and their relationship to the magnetic heads of the reproducing-recording mechanism.

Referring now to Fig. 7, it is seen that the surface of plate 22 is divided into a number of positions, each of which can be magnetized to represent a bit of information. The positions are determined by dividing the plate into columns of which there are six per plate side. Each column has digit value levels from 0 to 9 and zone value levels 11 and 12 for use when alphabetic information is to be stored. The six columns are subdivided into ten channels from 0 to 9 and each digit and zone level is subdivided into five levels from 0 to 4.

The intersection of any such levels and channel is termed a classification. For instance, the intersection of the 0 digit value level and the 0 column channels has the classification 00; the first or left hand digit referring to the level within a digit value and the second or right hand digit referring to the channel within a columnar division. An example of the classification 00 is shown in Fig. 7 wherein the value 006850 is stored on the plate 22 under this classification. Since the total value is a four digit value 6850, the ciphers 0 are used to fill out the columns to the left of the last significant digit. The positions representing the value 006850 are encircled and have lead lines extending to the digit represented. The cipher 0 is recorded at the 0 digit value on the intersection of the 0 level of the digit value and the 0 channel of column 6. The second digit from the left being a 0 cipher is recorded on the same 0 digit value level at the intersection of the 0 channel of column 5. The third digit from the left is a 6 and is recorded at the intersection of the 0 level of the 6 digit value and the 0 channel for column 4. The fourth digit from the left is an 8 and is recorded at the intersection of the 0 level of the 8 digit value and the 0 channel of column 3. The fifth digit is a 5 and is recorded at the intersection of the 0 level for the 5 digit value and the 0 channel for column 2. The last digit is a 0 and is recorded at the intersection of the 0 level for the 0 digit value and the 0 channel of column 1. The value 707345 has a classification 10 and is recorded in a similar manner with the difference that the digit value level is 1 in place of the 0 level used for value 006850. In like manner the value 982000 is recorded but the digit value level 2 is used in the classification. The spots representing these latter values are shown recorded in their proper positions on plate 22.

Figure 4:
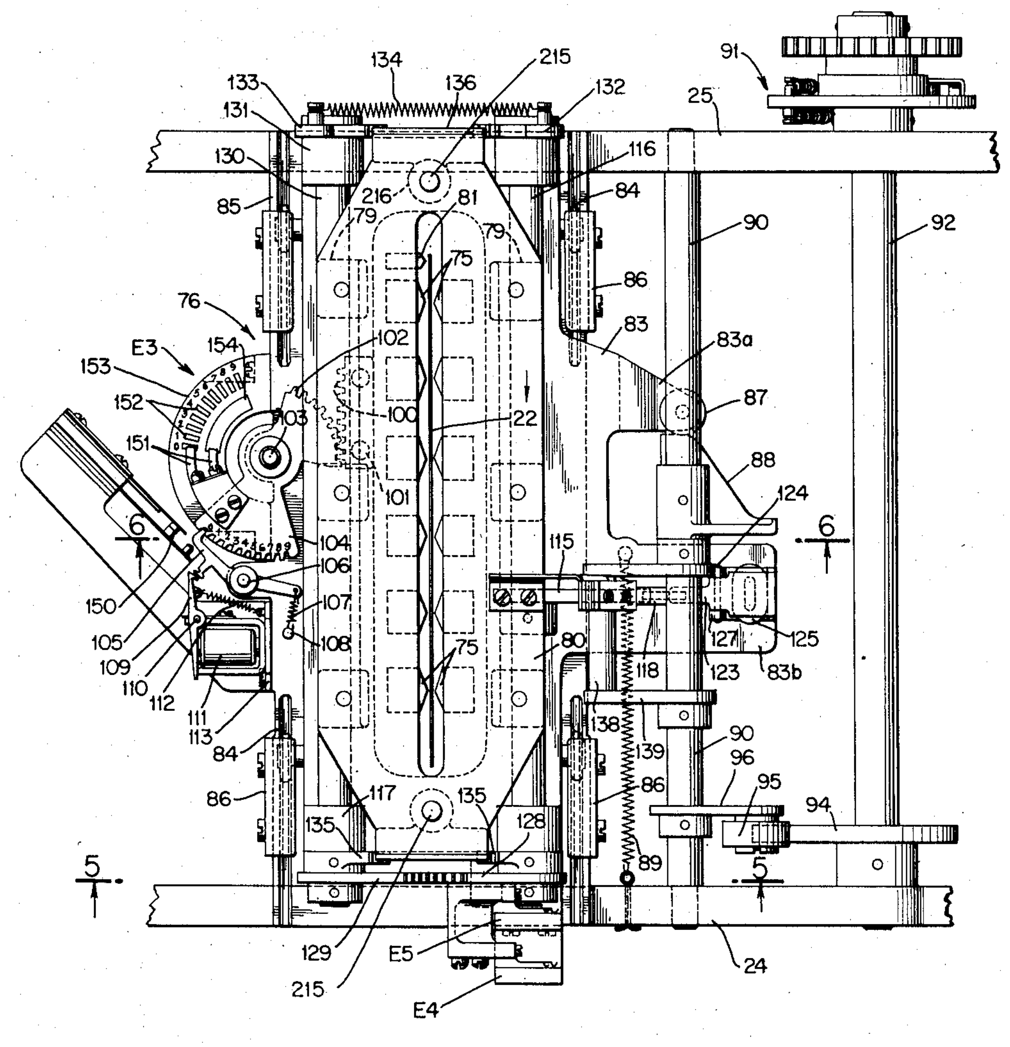
Fig. 4 is a plan view of the magnetic heads carriage.
Figure 6:
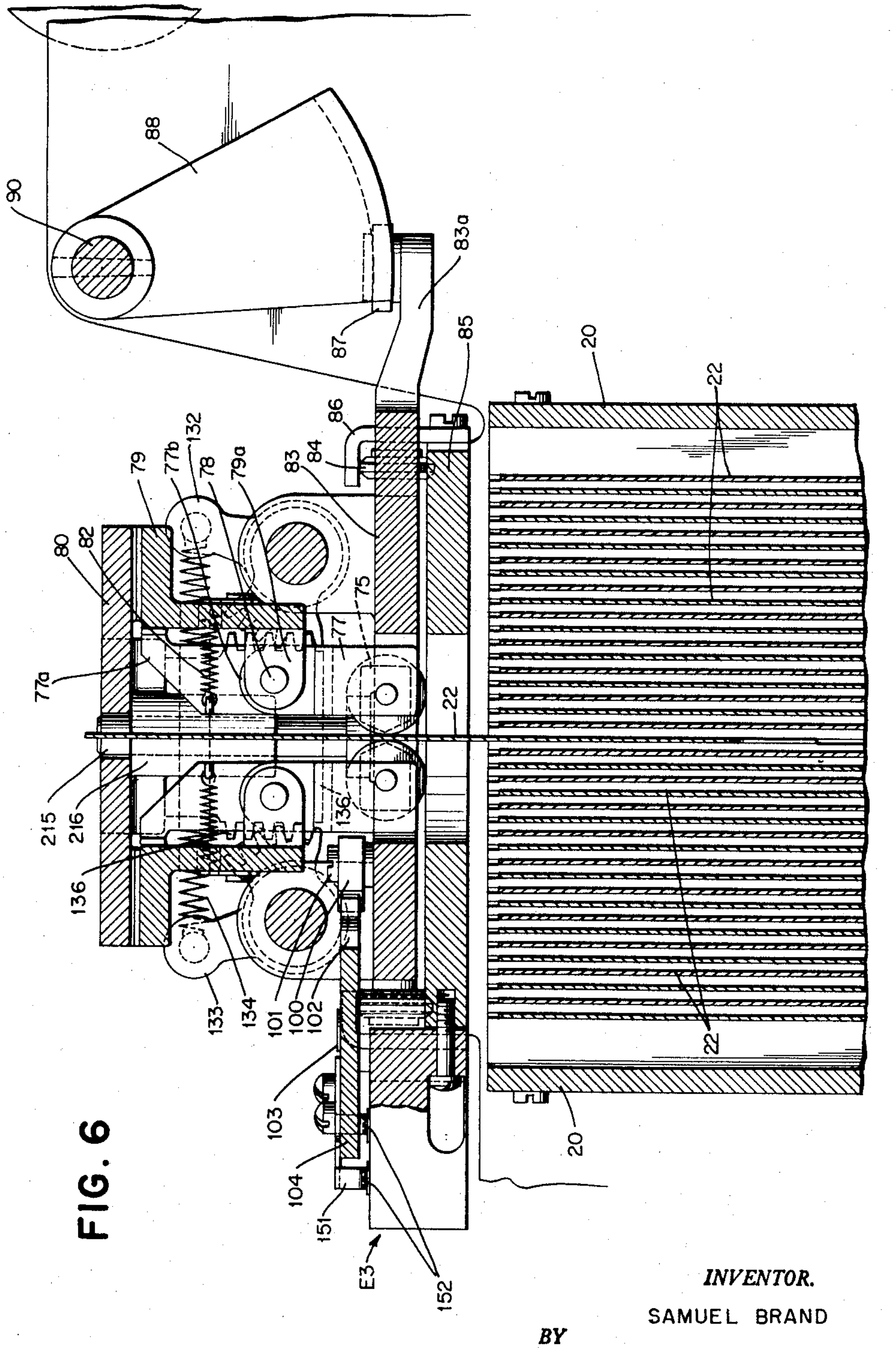
Fig. 6 is a sectional view taken along lines 6—6 of Fig. 4.

The magnetic heads are designated 75 in Fig. 7 and are shown positioned above each column on plate 22, so that one head can reproduce information from and record information on a corresponding column on one side of the plate. It is understood that similar magnetic heads are positioned to function in like manner on the other side of the plate as shown in Fig. 4. The magnetic heads 75 are mounted on a movable carriage 76 (Fig. 4). This carriage is provided with a carry plate 80 having an opening through which the plates 22 can pass for the reproducing and recording operations, the heads being disposed along the sides of the opening and facing inwardly. Each head 75 is carried by a U-shaped arm 77 (Figs. 6 and 7) having stem portions **77*a* and 77*b*. Each arm 77 is mounted to an ear 79*a*** projecting from a bracket 79 by means of a common pin 78 which passes through each stem portion. This bracket is secured to the under surface of the plate 80. A roller 81 is mounted for rotation on the lower portion of each arm 77 and is adapted to engage the surface of a plate 22 passing between the rows of heads 75 under pressure of a spring 82 extending between each arm stem 77*a* and its related bracket 79. These rollers permit the plate 22 to move freely through the opening in plate 80 and maintain a spaced relationship between the heads 75 and the plate moving between them.

The magnetic heads are adjusted by being moved laterally and vertically to place them in position to reproduce and record information at the various positions indicated by the classification numbers previously explained. This adjusting of the heads 75 makes possible the maximum use of the available magnetizable surface on the plate 22 and enables the use of a single head for each column of information to be stored.

In Fig. 4 it is seen that the carriage 76 is comprised of a base plate 83 having an opening through which the storage plates 22 can pass. The base plate is provided with two pairs of rollers 84 which are adapted to ride in grooves formed in a supporting plate 85. This supporting plate is also provided with an opening similar to the base plate and is secured between side frames 24 and 25. Extending upwardly from plate 85 are brackets 86 having turned over portions which cooperate with rollers 84 to restrain the carriage 76 from vertical movement. A pair of guide pins 215 (Figs. 5, 6) extend upwardly from carriage base plate 83. The plate 80 is slidably mounted on these pins through sleeves 216 to guide the plate in its vertical travel.

A magnetic head 81A is fixed on the supporting plate 85 near side frame 25. This head is stationary and reads a series of permanently magnetized spots located at one end of each plate 22. These spots are placed in all five levels of each digit and zone level to comprise a timing track which is read by head 81A as the plate moves past the magnetic heads 75.

The base plate 83 (Fig. 4) is formed with an extension 83*a* which acts as a cam follower and carries a roller 87. This roller is held against the surface of a helical barrel cam 88 under pressure of a spring 89 extending between a second extension 83*b* of plate 83 and the side frame 24. The cam 88 is secured on a shaft 90 which is rotatably mounted in rise portions of the machine side frames. The shaft 90 is driven from the same source as camshaft 66 through a clutch 91 and a shaft 92. This clutch is the well known one tooth ratchet type which is controlled by a magnet 93 (Fig. 9*a*). The shaft 92 carries a cam 94 which is engaged by a roller 95 mounted on a cam follower 96. This follower is secured on the shaft 90 and energization of the magnet 93 causes the clutch to engage to drive the shaft 92 one revolution. The cam 94 turns with shaft 92 to rock the camshaft 90. The contour of cam 88 is such that the carriage 76 is moved laterally or toward side frame 24, as viewed in Fig. 4, under the influence of the spring 89, when shaft 90 is rocked.

A rack 100 is carried by the base plate 83 and is secured thereto through screws 101. The teeth of this rack are in mesh with the teeth of a gear segment 102 which is mounted for rotation on a stud 103 extending upwardly from supporting plate 85. Integral with the segment 102 is a stop segment 104 which is provided with teeth representing each of the ten channels 0 to 9 of the columnar subdivisions on the storage plate 22. A rockable pawl 105 is mounted on a pin 106 extending upwardly from the plate 85. The tail of the pawl is urged clockwise (Fig. 4) by a spring 107 which extends between the tail of the pawl and a stationary pin 108. The tendency of the spring 107 is to swing the sharp nose of the pawl into engagement with the opposed teeth of segment 104 and thereby to arrest the carriage as shown in Fig. 4.

The pawl 105 is normally held from engagement with segment 104 by a latching member 109 pivotally mounted at 110 on the yoke of a magnet 111. A spring 112 extends between the latch 109 and a bracket 113 to constantly urge the latch toward latching engagement with the pawl 105. The latch 109 is the armature of magnet 111 which is momentarily energized in a manner described hereinafter. When the magnet is energized, the latch 109 is moved counterclockwise about the pivot point 110 and against the pressure of spring 112 to release the pawl to engage a tooth of segment 104. The releasing of pawl 105 closes a pair of normally open contacts 150 which are located in series connection with the box positioning pawl contacts 145 in the forementioned interlocking circuit.

As the carriage 76 moves toward side frame 24, as viewed in Fig. 4, the stop segment 104 is pivoted clockwise about the stud 103 by the interaction of gear segment 102 and the rack 100. When the carriage has moved to a position where the heads 75 are positioned in line with the proper channel of the columnar subdivisions, the magnet 111 is energized to release pawl 105 for engagement with the tooth of the stop segment corresponding to the desired channel. The carriage is thus stopped from further movement toward side frame 24 and is held fast under pressure of spring 89. The tooth preceding the 0 tooth on segment 104 is higher than the teeth representing channels 0 to 9 and is used to relatch the pawl 105. The carriage 76 is moved toward side frame 25 to the initial position by cam 88 and against the pressure of spring 89 during the resetting portion of the cycle. The segment 104 is moved counterclockwise through gear segment 102 and rack 100. The pressure of the high tooth of segment 104 against the nose of pawl 105 causes the pawl to pivot counterclockwise into laching engagement with the spring urged latch 109. Since the magnet 111 is not energized at this time, the latch is free to engage the pawl.

The segment 104 carries interconnected conducting brushes 151 which are moved in turn over the electrically conductive segments 152 and common strip 154 of an emitter E3 when the gear segment is moved clockwise by gear segment 102. These segments 152 and strip 154 are mounted on an insulating plate 153. This emitter operates in a manner similar to emitter E1 and has ten segments 152 which correspond to the ten columnar channels 0 to 9 as previously explained in connection with the description of the plate 22.

Figure 5:
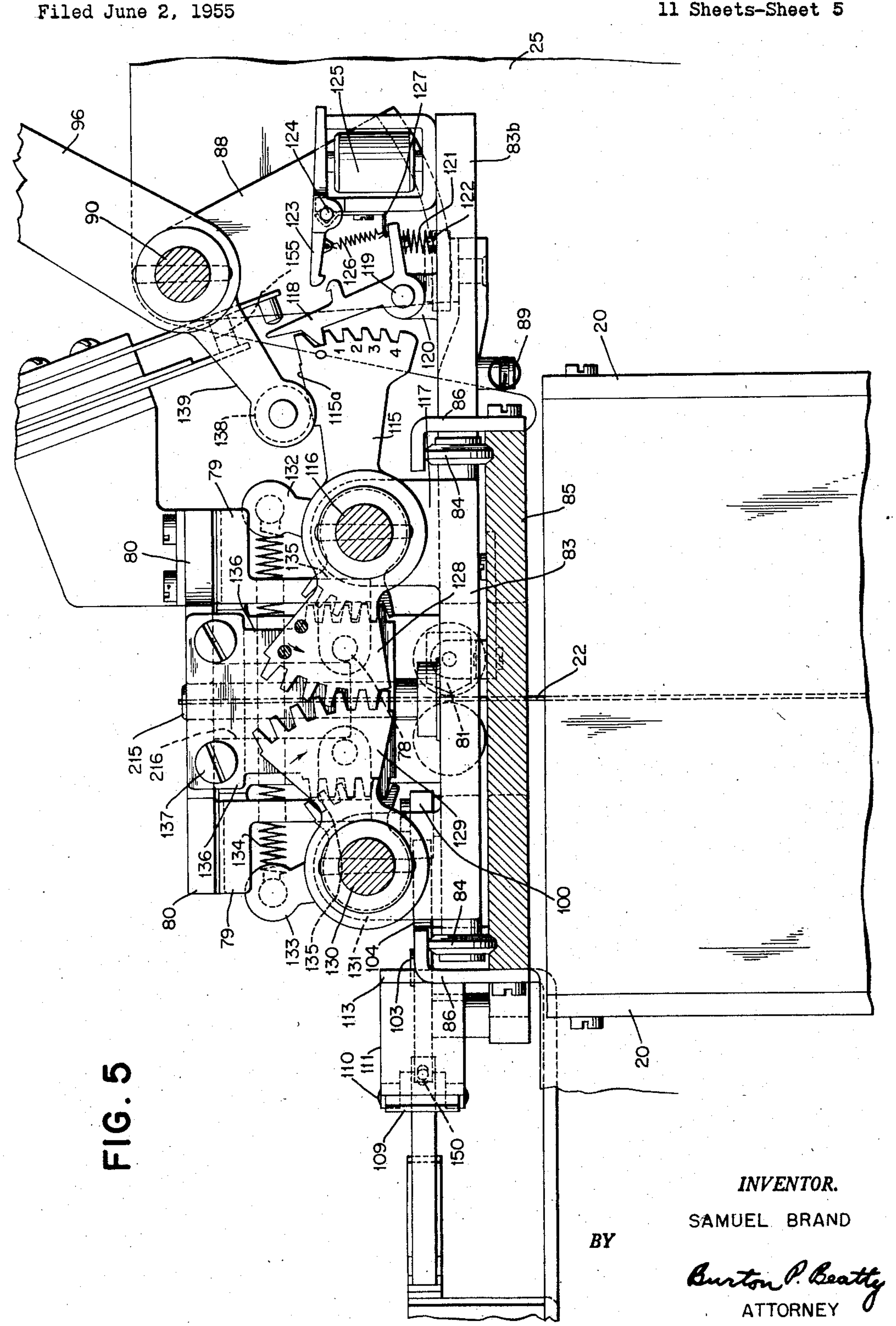
Fig. 5 is a sectional view taken along lines 5—5 of Fig. 4.

In order to position the heads 75 at the proper digit value level according to the classification number, the carry plate 80 is raised vertically to one of five positions. The carry plate is guided in this movement by the pins 215 as previously explained. Referring now to Fig. 5, a stop segment 115 is secured to a shaft 116 mounted for rotation in a pair of housings 117 secured on base plate 83. This segment is provided with teeth representing each of the levels 0 to 4 of the digit values on the storage plate 22. A rockable pawl 118 is mounted on a pin 119 carried by a bracket 120. The tail of the pawl is urged counterclockwise, as viewed in Fig. 5, by a compression spring 121 which extends between the tail of the pawl and a stationary pin 122. The tendency of the spring 121 is to bring the sharp nose of the pawl into engagement with the opposed teeth of the stop segment 115 and thereby arrest the vertical movement of carry plate 80.

The pawl 118 is normally held from engagement with segment 115 by a latching member 123, pivotally mounted at 124 on the yoke of a magnet 125. A spring 126 extends between the latch 123 and a bracket 127 to constantly urge the latch toward latching engagement with the pawl 118. The latch 123 is the armature of magnet 125 which is momentarily energized in a manner described hereinafter. When the magnet is energized, the latch 123 is moved clockwise about the pivot point 124 and against the pressure of spring 126 to release the pawl to engage a tooth of segment 115. The pawl 118 (Fig. 5) is released in synchronism with the pawl 105 (Fig. 4) which stops the movement of the carriage 76. The releasing of pawl 118 closes a pair of normally open contacts 155 which are placed in series connection with the pawl contacts 145 and 150 in the forementioned interlocking circuit.

A gear segment 128 is secured to shaft 116 and is in mesh with a cooperating gear segment 129 which is secured on a shaft 130. This shaft is mounted for rotation in housings 131 secured on base plate 83. The shafts 116 and 130 are provided with posts 132 and 133 respectively which are rigidly fastened thereon. A spring 134 extends between these posts to constantly urge shaft 116 counterclockwise and shaft 130 clockwise, as viewed in Fig. 5, through the interaction of gear segments 128 and 129. A small gear segment designated 135 is fastened to each shaft 116 and 130 near their extremities. These segments are in mesh with cooperating racks 136 secured to each end of carry plate 80 by means of screws 137. The gear segments 135 transmit motion from the shafts 116 and 130 to the racks 136 to raise or lower the carry-plate 80. The segment 115 has a raised camming surface **115*a* which is engageable by a bar 138. This bar is supported between arms 139 which in turn are rigidly fastened to the shaft 90**.

At the beginning of a head positioning cycle of operation the bar 138 is pressed against the segment surface **115*a* to hold the segment 115 down, thereby preventing any vertical movement of the carry plate 80. As the shaft 90 is rocked clockwise, as viewed in Fig. 5, the bar 138 is raised by arms 139. The segment 115 follows the upwardly moving bar under the influence of spring 134 to rotate shaft 116 which causes the carry plate 80 to move downwardly through the mechanism described above. The toothed end of segment 115 moves upwardly until the heads 75 are positioned in line with the proper digit value level whereupon the magnet 125 is energized to release pawl 118 for engagement with the tooth of segment 115 corresponding to the desired level. The carry plate 80 is thus stopped from further downward movement and held firmly in position under pressure of spring 134. The tooth preceding the 0 tooth on segment 115 is higher than the teeth representing digit value levels 0 to 4 and is used to relatch the pawl 118. The bar 138 is moved downwardly during the resetting portion of the cycle to again engage the surface 115*a* and cam the segment 115 downwardly. The pressure of the high tooth of segment 115 against the nose of pawl 118 causes the pawl to pivot clockwise into latching engagement with the spring urged latch 123. The magnet 125 is not energized at this time and latch 123 is free to engage the pawl. Also, the restoring of the segment 115 returns the carry plate 80** to its initial position.

Referring now to Figs. 9*a* and 9*c* of the wiring diagram, the segment 128 carries pairs of interconnected conducting brushes designated 156 and 157 which are moved over the electrically conductive segments 158 and 159 respectively of a pair of emitters E4 and E5 (Figs. 2, 4) when the gear segment is moved downwardly by rotation of shaft 116. The segments 158 and 159 are mounted on the usual insulating plates (not shown) which carry common strips 160 and 161. These emitters operate in a similar manner to emitters E1 and E3. Each emitter E4 and E5 has five conductive segments which correspond to the five levels 0 to 4 into which each digit and zone level is subdivided.

2. WIRING DIAGRAM AND OPERATION

A timing chart is illustrated in Fig. 8 which depicts the relative timing existing between the C and RW cam contacts, various emitters, clutches 91 and 69, and certain actuating cams. The machine cycle of Fig. 8 is divided into 360° as indicated at the top of the drawing. It will be explained hereinbelow that the energization of clutch 91 causes cams 94 and 88 to be actuated, thereby positioning the magnetic heads vertically and laterally. After the magnetic heads are fully positioned energization of clutch 69 is effected. The operation of clutch 69 initiates a "reproducing-recording" cycle during which data may be stored on or read from the address at which the heads were positioned.

In Figs. 9*a*, 9*b* and 9*c* the circuits are shown which are suitable for a selector device to effect the proper positioning of the storage box 20 for selection of a plate 22, and the magnetic heads 75. Also, the circuits for reproducing information from or recording information on the selected storage plate are shown. However, it is noted from Fig. 7 that each plate 22 is provided with digit and zone value levels for use in recording alphabetic information from a combinational code. For purposes of explaining the operation of the present invention the circuitry necessary for the reproducing and recording of numeric information only is shown. The plate emitter E2 is therefore represented as having only ten conductive segments 147 to correspond with the ten digit positions on the plate 22.

The selector shown in Figs. 9*a* and 9*b* has ten units box address keys carrying designations 0 through 9 and four tens box address keys numbered 0 through 3, ten keys for controlling the lateral movement of the magnetic heads and designated 0 through 9, five keys for controlling the vertical movement of the magnetic heads and designated 0 through 4, and twelve columns of ten amount keys carrying designations 0 through 9. These keys are set to condition circuits for selecting the proper plate 22 and for the reproducing and recording of desired information. In addition the selector includes an address motor bar key 165, a record key 166, a reproduce key 167, and reproduce-record key 168, and a reproduce-record motor bar key 169. Upon depression of a key, it remains latched down until another key for the same function is depressed. This is accomplished by mechanism operating in the manner disclosed in U.S. Patent No. 2,142,352, issued January 3, 1939, to F. L. Fuller et al. The keys designated 165 and 169 are exceptions and restore automatically when released.

3. LOCATING SELECTED ADDRESS

In order to properly position the plate box 20 and the magnetic heads 75 for a reproducing or recording operation, an address is placed in the selector keys. For example, in selecting storage plate 28 the 8 storage box address key in the units position and the 2 box address key in the tens position are depressed. The address motor bar key 165 is then depressed to complete the following circuit through the pick-up coils of relays R10 and R12 when cam contacts C1 are closed at 0° (Fig. 8) of the machine cycle: From line 171, through cam contacts RW1 (normally closed), key contacts **165*a***, relay contacts R14*a* (normal), cam contacts C1 (now closed), pick-up coils of relays R10 and R12 to line 172. The cam contacts RW1 are closed during the portion of machine operation when an address is being entered in the selector keys. The RW cams are only rotated when the clutch 69 is engaged for a reproducing-recording cycle of operation. The RW1 cam contacts are initially normally closed and remain closed until clutch 69 is energized as explained hereinbelow. However, once clutch 69 is energized, the RW1 cam contacts are opened at 347° and remain open until 337° of the following machine cycle as shown in the timing chart of Fig. 8. The holding circuit for relay R10 is established when cam contacts C3 are closed at 5° as follows: From line 171, through cam contacts C3, relay contacts **R10*a* (now closed), hold coil of relay R10 to line 172. The relay R12 is held by a circuit as follows: From line 171, through box release contacts 140 (normally closed), relay contacts R12*a* to line 172**.

The energization of relay R10 causes closure of its *b* contacts to pick up relay R14 and the head operating clutch magnet 93 (associated with clutch 91 of Fig. 4) when cam contacts C2 are closed at 18° through a circuit as follows: From line 171, cam contacts C2, relay contacts R10*b*, pick-up coil of relay R14 and coil of clutch magnet 93 to line 172. Relay R14 transfers its R14*a* contacts to provide a holding circuit through the closed motor bar contacts 165*a* and cam contacts RW1. This holding circuit acts as an interlock by breaking the circuit to the pick-up coils of relays R10 and R12, thereby preventing these coils from being repeatedly energized when the motor bar key 165 is held down.

The relay contacts R12*b* are closed by the energization of relay R12 to cause energization of box return solenoid 39. This circuit remains until the storage box 20 returns to the end of its stroke and opens the normally closed box release contacts 140 which in turn drop out relay R12 and solenoid 39.

The energization of magnet 93 causes the clutch 91 to become engaged at 36° of a head positioning cycle, whereby shaft 90 is rotated one revolution. The cam 88 moves with shaft 90 to restore the heads 75 to the position shown in Fig. 4 on the first part of the cycle. The heads are fully restored at 170° (Fig. 8) and the pawls 105 and 118 (Figs. 4, 5) are held out of engagement with segments 104 and 115 respectively. On the latter portion of the cycle these segments are rotated as previously described until a circuit is completed through the related emitter to the associated stop magnet. In the present example, if it is desired to record or reproduce the value 006850 at classification 00 as shown in Fig. 7, the 0 lateral movement key and the 0 vertical movement key are depressed at the same time that the motor bar key 165 is actuated. When the brush 151 of emitter E3 wipes the 0 conductive segment 152, a circuit is completed as follows: From line 171 through key contacts 162 (now closed), segment 152, brush 151, common strip 154, stop magnet 111 to line 172. In like manner, when the brush 156 of emitter E4 wipes the 0 contactor segment 158, a circuit is completed as follows: From line 171 through key contacts 163 (now closed), segment 158, brush 156, common strip 160, stop magnet 125 to line 172. The energization of these stop magnets 111 and 125 causes the release of pawls 105 and 118 respectively to engage the 0 teeth of gear segments 104 and 115. The rotation of the gear segments is thus stopped and the emitter brushes 151 and 156 come to a rest position between conductive segments. The circuits to magnets 111 and 125 are of short duration and are broken by this action of the brushes.

After the box release contacts 140 have been opened, the storage box 20 is moved under pressure of spring 38 (Fig. 2) as previously described. The 2 (tens) and the 8 (units) box address keys have been depressed and the box will continue to move until the brush 141 of emitter E1 wipes the conductive segment 142 representing the plate position twenty eight. The following circuit is then established: From line 171, through contacts 175 of units key 8 (now closed), wires 176, 177, and 178, segment 142, brush 141, common strip 144*c*, contacts 179 of tens key 2 (now closed), wire 180, stop magnet 52, to line 172. The energization of the stop magnet 52 causes the release of pawl 45 to engage the twenty eighth tooth on rack 44. The advance of the box 20 is stopped and the emitter brush 141 comes to rest between the conductive segments. The circuit to magnet 52 is also of short duration and is broken by this action of brush 141. The machine is now prepared for the following operation which is either reproducing or recording information.

4. RECORDING OR REPRODUCING DATA AT SELECTED ADDRESS

Referring now to Fig. 9*b*, the information to be recorded is placed in a keyboard having columns of keys designated 181. Only three columns are shown, it being understood that there are twelve such columns. Six columns are utilized for recording information on one side of a plate 22. In the present example the 0 keys 181 in columns 6 and 5 are depressed and the 6 key 181 in column 4 is depressed to prepare the circuits for the recording of digits 006. The remaining digits 850 are set in columns 3, 2 and 1 (not shown) in a similar manner.

When pawls 45, 105 and 118 are actuated, the pawl contacts 145, 150 and 155 related to these pawls are closed. Depression of the reproduce-record motor bar key 169 establishes a circuit through these contacts to pick up a relay R16 at 306° when cam contacts C4 close as follows: From line 171, through pawl contacts 145, 150 and 155, key contacts 169*a*, relay contacts R18*a* (normal), cam contacts C4, pick-up coil of relay R16 to line 173. Relay R16 closes its R16*a* contacts to provide a holding circuit through cam contacts C5 which are closed at 311°. The pawl contacts 145, 150 and 155 are located in series to assure that the positioning of heads 75 and plate box 20 is completed before the reproducing or recording operation is initiated.

The energization of relay R16 also closes its R16*b* contacts to pick up relay R18 and the plate clutch magnet 70 when cam contacts C6 close at 324° as follows: From line 171, through C6, contacts R16*b*, pick-up coil of relay R18 and clutch magnet 70 to line 173. Relay R18 transfers its R18*a* contacts to provide a holding circuit through the pawl contacts 145, 150 and 155 and the closed key contacts 169*a*. It is noted that the transfer of the relay contacts R18*a* breaks the circuit through the pick-up coil of relay R16 and prevents this relay from being repeatedly energized while the key 169 is held down.

The energization of magnet 70 causes the clutch 69 to engage at 342° (Fig. 8) and drive the shaft 66 for one revolution (Fig. 3). The cam 63 rotates with the shaft to actuate the pusher arms 23 which move the selected plate 22 upwardly past the heads 75 from 2° to 144° of the following cycle for reproducing and downwardly past the heads from 182° to 324° for recording.

A. RECORDING OF INFORMATION

In order to record information, the record key 166 must be depressed when a relay R20 is picked up as cam contacts RW4 close at 167° through the following circuit: From line 171, through cam contacts RW4, key contacts 166*a* (now closed), pick-up coil of relay R20, to line 173. Relay R20 closes its R20*a* contacts to provide a holding circuit through cam contacts RW2 which also close at 167°. Contacts R20*b* (Fig. 9*c*) are transferred by the energization of relay R20 to provide a path to the record coils 75*a* of magnetic heads 75 through the selected column keys 181. Fig. 9*c* shows in block diagram an electronic system for obtaining a properly timed pulse from the timing head 81 to record the desired information. This head 81 transduces a magnetic spot at each of the five levels in each digit and zone level position on a plate 22 to emit a voltage pulse which is amplified by voltage amplifier 185 and shaped by a shaping circuit designated 186. This voltage pulse is impressed via cathode follower 187 and wire 189 on the first stage of electronic counter 190. This counter is utilized for generating electrical voltage pulses that are accurately synchronized in time with the physical displacement of the storage plate 22. Since the digit to be recorded has a 00 classification, the brush 157 of emitter E5 is resting on the 0 conductive segment 159. The recording circuit for column 1 is established from the timing head 81, as described above, through counter 190, wire 188, 0 segment 159, bush 157, common strip 161, contacts R20*b* (transferred), wire 191, common strip 149 of emitter E2, brush 146, 0 segment 147, wire 192, 0 key of column 6, wire 193, amplifier 194, cathode follower 195, record coil 75a of magnetic head 75 in column 6 to ground. At the same time a similar circuit is completed through 0 key of column 5, line 196, amplifier 197, cathode follower 198, record coil 75a of magnetic head 75 in column 5 to ground. When the brush of emitter E2 wipes the 6 segment 147, another impulse from the timing head 81 is sent to the record coil of magnetic head 75 in column 4. The recording circuit is established from the timing head, as described above, through 0 segment 159, brush 157, common strip 161, contacts R20b (transferred), wire 191, common strip 149 of emitter E2, brush 146, 6 segment 147, wire 192, 6 key of column 3, wire 199, amplifier 200, cathode follower 201, record coil 75a of magnetic head 75 in column 3 to ground. It is thus seen that the magnetic heads 75 are energized at the proper time with respect to the movement of plate 22 to magnetize the surface of the plate at the required position, whereby a magnetic spot or bit of information is placed thereon.

The recording of a new value on the plate 22 will cause the old value to be erased. If it is desired to erase an old value without recording a new value, the initiation of a recording cycle with no column keys depressed erases the old value.

B. REPRODUCING OF INFORMATION

In order to reproduce information already recorded on a plate, the reproduce key 167 (Fig. 9*b*) and the reproduce-record motor bar key 169 are depressed. It is assumed that the heads 75 have already been positioned and depression of key 169 establishes a circuit through the contacts controlled by the operation of the pawls 45, 105 and 118 to pick up relay R16 at 306° as before. This relay holds through cam contacts C5 which close at 311°. Relay R18 is picked up along with clutch magnet 70 when cam contacts C6 close at 324° and held as before. When cam contacts RW3 close at 347° (Fig. 8), a relay R22 is picked up through a circuit as follows: From line 171, through key contacts 167a (now closed), pick-up coil of relay R22 to line 173. Energization of relay R22 closes its R22a contacts to establish a holding circuit for this relay through cam contacts RW2 which close at 347°.

Suppose, for example, that the value to be reproduced is 707345 and has a classification 10 as shown in the chart of Fig. 7. The brush 157 of emitter E5 is then resting on the 1 conductive segment 159. Energization of relay R22 also causes closure of its R22b contacts to provide a path to one input terminal of coincidence circuits 202 for the voltage pulses from timing head 81. The coincidence circuits 202 are And circuits and are provided in each column position. An And circuit refers to a circuit that is operable to produce an output voltage signal at its output terminal only when all of the input terminals thereof have a predetermined voltage applied thereto simultaneously. The path is traceable from timing head 81, through amplifier 185, shaping circuit 186, cathode follower 187, wire 189, through the counter 190, 1 segment 159, brush 157, common strip 161, contacts R20b (normal), wire 203, contacts R22b (now closed), and wire 204 to one input terminal of the And circuits 202. The other input terminal of each circuit 202 receives a voltage pulse from the related magnetic head 75 when a magnetic spot is read by the head. The path of this pulse is traceable from the reproduce coil 75b of magnetic head 75, through voltage amplifier 205, shaping circuit 206, cathode follower 207, latch 208, and wire 209 to the other input terminal of circuit 202. A coincidence of positive pulses at the input terminals of a circuit 202 from the timing head and the related read head causes a pulse to be sent to the utilization means through wire 210. The latches 208 are similar to the latch shown in Fig. 4 of U.S. Patent 2,628,309 granted to E. S. Hughes and function in like manner.

C. REPRODUCING AND RECORDING IN ONE MACHINE CYCLE

One feature of this invention is the reproducing and recording of information on one machine cycle during a single engagement of the clutch 69. For this purpose the reproduce-record key 168 (Fig. 9*b*) is depressed to close key contacts 168a and 168b. Closure of these contacts causes relays R20 and R22 to be energized at the proper time, as explained above in connection with a separate reproduce or record operation, to effect reproducing and recording during one revolution of the plate operating clutch 69.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limted only as indicated by the scope of the following claims.

What is claimed is:

1. In a cyclically operable apparatus for recording and reproducing information, an element having a plurality of recording positions, certain of said recording positions having information recorded thereon, a plurality of transducing devices, means for positioning said devices on one cycle of operation for cooperation with said certain recording positions, means to move said element past said devices in two directions on the following cycle whereby said element is scanned by said transducing devices a plurality of times, and means for causing said devices to reproduce the recorded information when the element is moved in one direction, and means cooperating with a portion of said last named means for causing said devices to record information in certain ones of said certain recording positions when the element is moved in the opposite direction.

2. The apparatus as set forth in claim 1, wherein the element comprises a plate having a magnetizable surface and the transducing devices are electromagnetic.

3. In a cyclically operable information reproducing, selecting and storing apparatus, a plurality of elements having recording positions thereon, a plurality of transducing devices, means for selecting a predetermined one of said elements on one cycle of operation, means for positioning said devices on the same cycle for cooperation with certain of said recording positions, means for moving the selected element past said devices in two directions on the following cycle, whereby said selected element is scanned by said transducing devices a plurality of times, and means for conditioning said devices to transduce said certain recording positions when the element is moved in either direction.

4. In a cyclically operable information reproducing, selecting and storing apparatus, a receptacle, a plurality of storage elements having recording positions thereon contained in said receptacle, a plurality of transducing units, an element selecting device, means for moving said receptacle past said selecting device, means for actuating said selecting device to engage said receptacle and arrest its movement at a predetermined position on one cycle of operation, whereby a particular one of said storage elements is selected, means for positioning said units on the same cycle of operation for cooperating with certain of the recording positions on the selected element, means for moving the selected element out of said receptacle and past said units in two directions on the following cycle, whereby said selected element is scanned by said units a plurality of times, and means for conditioning said units to transduce said certain recording positions when the selected element is moved in either direction.

5. The apparatus as set forth in claim 4, wherein each storage element comprises a plate having recording positions located on each side thereof, and the transducing units are disposed in two rows, the selected storage element being moved between the rows of transducing units for the transducing operation.

6. The apparatus as set forth in claim 4, wherein the receptacle for the storage elements comprises a box which is provided with a rack member, the selecting device engaging said rack member to arrest movement of said box.

7. The apparatus as set forth in claim 4, wherein each element has a plurality of tracks, each track having a plurality of the recording positions thereon, and in which the positioning means includes a movable carriage and a shiftable member on said carriage to carry the transducing units, and means is provided for moving said carriage in a predetermined path, whereby said units are positioned for cooperation with certain of said tracks, and means for shifting said member with respect to the carriage, thereby positioning said units to cooperate with selected ones of the recording positions on said certain tracks when said units are conditioned.

8. The apparatus as set forth in claim 7, wherein the carriage is moved in a predetermined path and the shiftable member is shifted transversely with respect to the carriage.

9. In an apparatus for reproducing and recording information, an element having a surface with a plurality of recording positions, a plurality of tracks on said surface of said element, each track having a plurality of said recording positions thereon, a plurality of transducing devices, means for positioning said devices to cooperate with certain of said tracks, means for shifting the position of said devices to cooperate with selected ones of the recording positions on said certain tracks, means for moving said element past said devices in two directions, whereby said element is scanned by said transducing devices a plurality of times, and means including said shifting means for conditioning said devices to transduce only the selected recording positions when the element is moved in either direction.

10. In an apparatus for reproducing and recording information, an element having a plurality of recording positions, a plurality of tracks on said element, each track having a plurality of said recording positions thereon, a movable carriage, a shiftable member on said carriage, a plurality of transducing devices carried by said member, means for moving said carriage to position said devices for cooperation with certain of said tracks, means for shifting said member with respect to the carriage, whereby said devices are positioned to cooperate with selected ones of the recording positions on said certain tracks, means for moving said element past said devices in two directions, whereby said element is scanned by said transducing devices a plurality of times, and means for conditioning said devices to transduce the selected recording positions when the element is moved in either direction.

11. In an apparatus for reproducing and recording information, an element having a plurality of recording positions, a plurality of tracks on said element, each track having a plurality of said recording positions thereon, a movable carriage, a plate supported for movement on said carriage, said plate having an opening therein, a plurality of transducing devices carried by said plate and arranged in rows along the sides of said opening, means for moving said carriage to position said devices for cooperation with certain of said tracks, means for moving said plate with respect to the carriage, whereby said devices are positioned to cooperate with selected ones of the recording positions on said certain tracks, means for moving said element through said opening between the rows of transducing devices in two directions, whereby said element is scanned by said transducing devices a plurality of times, and means for conditioning said devices to transduce the selected recording positions when the element is moved in either direction.

References Cited in the file of this patent

UNITED STATES PATENTS

| | | |
|---|---|---|
| 2,540,654 | Cohen et al. | Feb. 6, 1951 |
| 2,650,830 | Potter | Sept. 1, 1953 |
| 2,690,913 | Rabinow | Oct. 5, 1954 |
| 2,722,676 | Begun | Nov. 1, 1955 |